J. A. Talpey,
Tedder.

No. 91,790.　　　　　　　　　Patented June 22, 1869.

Joseph A. Talpey
by his Attorney
A. Pollok

WITNESSES.

United States Patent Office.

JOSEPH A. TALPEY, OF SOMERVILLE, MASSACHUSETTS.

Letters Patent No. 91,790, dated June 22, 1869.

IMPROVEMENT IN HAY-SPREADERS.

The Schedule referred to in these Letters Patent and making part of the same.

*To whom it may concern:*

Be it known that I, JOSEPH A. TALPEY, of Somerville, county of Middlesex, and State of Massachusetts, have invented certain new and useful Improvements in Hay-Spreaders; and I hereby declare the following to be a full, clear, and exact description of the same, reference being had to the accompanying drawing, in which—

Figure 1:
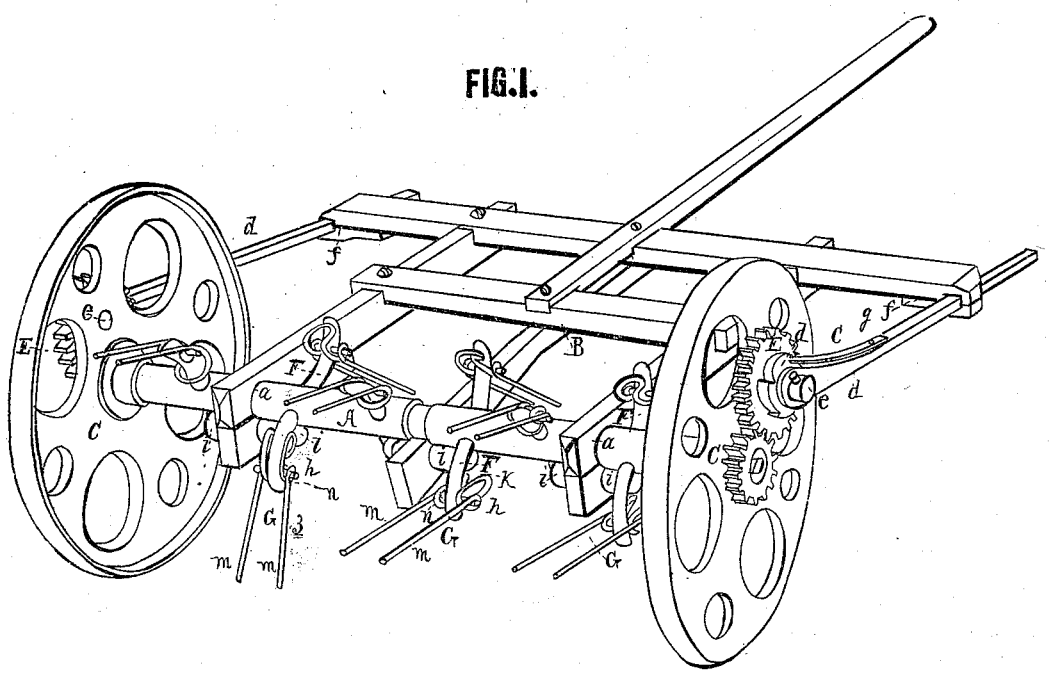
Figure 1 is a perspective view of a hay-spreading machine, made in accordance with my invention.

My invention has relation to the construction and arrangement of the teeth or forks of hay-spreading machines, as well as of the mechanism for operating such forks; and its object is to produce a machine of much less complicated structure, and in which the parts necessary to render it operative are fewer and less liable to be injured than has heretofore been practicable; and a further object is to prevent the hay from being carried over the machine by the revolving forks, a defect which is noticeable in ordinary machines of this class.

To this end the principal features of my invention may be stated as follows: .

First, the combination, with the axle or revolving fork-head, of a series of forks, each pivoted or swinging upon an arm projecting from said head, and provided with an upper end, which, at a certain time, during the revolution of the fork-head, is brought in contact with a cam-pin, or its equivalent, upon the frame, in the manner hereinafter described, whereby each fork, as it passes its stationary pin, has first an upward movement given it, so as to toss or flirt up the hay, and then drops so as to allow the hay to escape, and not be carried with it over the machine.

Second, constructing each fork of a continuous piece of metal, bent so as to form the two tines, the eyes or sockets for receiving the pin or pivot on which the fork swings, and the curved upper end, which bears against the arm on which the fork is hung, while the teeth are gathering up the hay, and is operated by the stationary cam-pin, to produce the flirting or tossing of the hay, as above described.

Third, the combination, with the axle, which also constitutes the fork-head, and the pinions fixed upon its ends, of wheels mounted upon said axle, and carrying eccentric gears, meshing with the pinions fixed upon the axle, and of larger size than said pinions, so as to impart to the same, during the revolution of the wheels, a rotary movement, the velocity of which, in excess of that of the wheels, is governed by the relative proportions of the pinions and eccentric driving-gears, as hereinafter explained.

Fourth, the employment, in connection with the eccentric gears, on the wheels of the machine, of ratchets and pawls, combined with said gears, as hereinafter described, so that when the wheels move forward, the gears shall drive and rotate the axle, and when the wheels are moved backward, shall revolve freely around the axle, without rotating it.

These and other features of my invention will be fully understood by reference to the accompanying drawings.

A is the axle and fork-head, upon which the frame B is supported, by bearings *a*, in which the axle is free to turn.

Upon the outer ends of the axle are mounted the wheels C, upon which the machine runs.

To the ends of the axle, which project beyond the wheels, are keyed pinions D, and mounted eccentrically upon the face of the wheels, so as to revolve independently of the same, and to mesh with the axle-pinions, are the larger gears E, whose size is governed by the rate of speed of rotation to be imparted to the axle in excess of that of the wheels.

Thus the axle, while supporting the wheels, is caused to move, by a positive mechanism, in a direction contrary to that in which the wheels move, and with a speed which is greater than that of the wheels, and increases in proportion as the size of the driving-gear exceeds that of the pinions.

By providing a number of gears, E, of varying sizes, and forming sockets for their journals or axes, at proportionate distances from the centre of the wheel, it will be seen that by applying a gear of the desired size, any required rate of rotation can be given the axle, and this rate can at any time be changed by changing the gear.

As shown in the drawings, each set of gears and pinions is located on the outer face of the wheel, but their position can be shifted to the inner face without trouble.

In order to rotate the axle only, when the machine moves forward, I secure on the hubs, *e*, of the gears, ratchet-wheels *b*, and upon the same hubs, or upon the journals of the gears, are loosely mounted pawls or clicks, *c*, which engage with the teeth of the ratchets, when the wheels move forward, but ride over the teeth when the movement of the machine is reversed.

The pawls in this instance are fastened to rods *d*, which loosely fit upon the hub or journal *e*, and are arranged so that their forward ends will rest in and play through slots formed in the front bar *f* of the frame of the machine.

Each pawl, *c*, may be held to its place by a spring, or, as shown in the drawings, may itself constitute also a spring for the purpose; and I prefer to pivot it to the rod *d* at *g*, so that it may be turned entirely aside from the ratchet-wheel, when desired, thus allowing the machine to move forward without rotating the fork-head, which is essential when going to or returning from the field.

From the above description of the driving-mechanism, its operation will be understood without further explanation, and I therefore pass to the description of the forks, and the manner in which they are combined for operation with the axle.

A series of radial arms, F, projects from the axle or fork-head, and is intended to carry the forks.

The arrangement and form of these arms are preferably as shown in the drawings, but they may be otherwise suitably shaped and arranged, without affecting the character of my invention.

Upon each of the arms is hung a fork, G, by means of a pin or pins, h, above which the upper end of the fork extends some distance.

Figure 2:
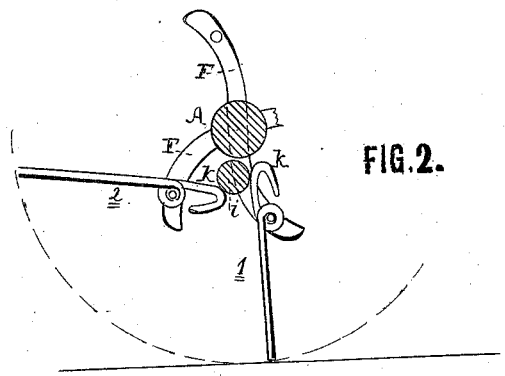
Figure 2 is a transverse section of the axle detached, representing more clearly the manner in which the spreading-teeth are operated.

In proximity to each set of forks is placed a pin or bar, i, or its equivalent for the purpose, which, while not interfering with the rotation of the axle and forks, is so arranged that as each fork of the set comes down in position to take up the hay, its upper end, K, which projects a suitable distance from the side of the arm F, will strike against the pin, as shown at 1 in fig. 2. As the fork-head continues to revolve, the upper end of the fork is caught under the pin and depressed, as seen at 2, fig. 2, thus tilting or throwing up the tines of the fork, and tossing the hay.

Finally, the fork-head, in its revolution, carries up the fork far enough to allow the upper end to clear the pin, when the tines will drop downward, until the upper end strikes against the radial arm F, as shown at 3, fig. 1, thus throwing off the hay, or allowing it to drop, and preventing its being carried over the machine.

The forks continue their revolution, and are again brought successively in position, to toss and spread the hay, as above described.

I prefer to make each fork, as shown in the drawing, of a continuous piece of wire, which is bent so as to form the tines m, the eyes or sockets n, and the upper end K, the latter being bent so as to engage with the pin or tilting-device i, and to form a firm bearing, which, when the fork is not acted on by the pin i, will fit against the arm F.

The projecting loop-part of the end K also is adapted to strike against the end of the radial arm F, thus preventing the fork from falling too far as it turns over.

While I prefer to give the forks this form, it is manifest, however, that their construction may be varied considerably, all that is necessary, being that their upper ends should be so made as to bear against the arms F, and engage with the pins i, at the proper time.

Having now described my invention, and the manner in which the same is or may be carried into effect,

What I claim, and desire to secure by Letters Patent, is—

1. The combination, with the revolving fork-head and the series of pivoted or swinging forks which it carries, of a corresponding series of tilting-pins, or their equivalent, under the arrangement described, so that the tines of each fork shall, as they take up the hay, be elevated by said tilting-device, and after having tossed the hay, shall, by the disengagement of the fork from the tilting-device, be free to drop, substantially as and for the purposes set forth.

2. The construction of the forks in the form herein shown and specified.

3. The combination, with the revolving axle and fork-head, and pinions which it carries, of wheels mounted on said axle, and eccentric gears pivoted to said wheels, under the arrangement, and for operation as set forth.

4. The combination, with the driving-gear, mounted eccentrically on the face of the wheel, and ratchet connected with the same, of the pivoted pawl, and its supporting-rod, fitting upon the axis of the gear, and supported in the frame of the machine, as and for the purposes specified.

5. The combination of the combined axle and fork-head, the frame with which it is connected, the pivoted forks and their tilting-pins, and the mechanism for rotating said axle under the arrangement and for operation as set forth.

In testimony whereof, I have signed my name to this specification, before two subscribing witnesses.

JOSEPH A. TALPEY.

Witnesses:
SELWIN Z. BOWMAN,
BENJ. H. CURRIER.